United States Patent [19]

Tanaka et al.

[11] Patent Number: 4,772,962
[45] Date of Patent: Sep. 20, 1988

[54] STILL IMAGE RECORDING AND/OR REPRODUCING APPARATUS

[75] Inventors: Satomi Tanaka, Tokyo; Eiichi Ichimura, Saitama, both of Japan

[73] Assignee: Sony Corporation, Tokyo, Japan

[21] Appl. No.: 919,218

[22] Filed: Oct. 15, 1986

[30] Foreign Application Priority Data

Oct. 23, 1985 [JP] Japan .............................. 60-236569
Oct. 23, 1985 [JP] Japan .............................. 60-236570
Oct. 29, 1985 [JP] Japan .............................. 60-242446

[51] Int. Cl.⁴ ..................... H04N 5/781; G11B 27/10
[52] U.S. Cl. ..................... 360/10.1; 369/32; 369/33; 360/35.1; 360/72.2
[58] Field of Search ............ 369/32, 30, 33, 41; 360/35.1, 72.2, 72.1, 10.1

[56] References Cited

U.S. PATENT DOCUMENTS

| | | | |
|---|---|---|---|
| 4,321,635 | 3/1982 | Tsuyuguchi | 369/32 |
| 4,446,488 | 5/1984 | Suzuki | 358/342 |
| 4,641,295 | 2/1987 | Furukawa | 369/32 |
| 4,667,314 | 5/1987 | Iwashima | 369/32 |

FOREIGN PATENT DOCUMENTS

| | | |
|---|---|---|
| 0081958 | 6/1983 | European Pat. Off. . |
| 0105213 | 4/1984 | European Pat. Off. . |
| 3008190 | 9/1981 | Fed. Rep. of Germany . |
| 2529004 | 12/1983 | France . |
| 2544536 | 10/1984 | France . |
| 59-207407 | 11/1984 | Japan . |
| 60-76071 | 4/1985 | Japan . |

Primary Examiner—Alan Faber
Attorney, Agent, or Firm—Alvin Sinderbrand

[57] ABSTRACT

In an information recording and/or reproducing apparatus in which a spindle motor rotates a magnetic recording disc at a predetermined speed while a transducer head is in contacting relation to the disc for recording and/or reproducing information signals in substantially circular concentric record tracks thereon, and a transducer positioning device is coupled to the transducer head for positioning the latter on a selected one of said record tracks; a memory is provided for storing identification signals which correspond to the various types of information signals recorded in concentric record tracks, respectively, and a display is coupled to the identification signal storing memory for displaying simultaneously the identification signals for all of the record tracks.

11 Claims, 10 Drawing Sheets

STILL IMAGE RECORDING AND/OR REPRODUCING APPARATUS

BACKGROUND OF THE INVENTION

1. Field of the Invention

This invention relates generally to a still image recording and/or reproducing apparatus and, more particularly, is directed to a still image recording and/or reproducing apparatus utilizing a disc-shaped magnetic recording sheet.

2. Description of the Prior Art

Various kinds of still image recording and/or reproducing apparatus utilizing a disc-shaped magnetic recording sheet have been proposed. More particularly, a novel 2-inch floppy disc has been developed recently, and was initially intended for use with an electronic still camera. However, such small floppy disc is now considered to be applicable, not only to the electronic still camera, but also for other purposes, such as, still video image recording or reproducing, audio recording or digital data recording and so on.

Prior applications and patents assigned to the assignee of the present application have mainly dealt with the structure of a jacket for accommodating therein the small diameter magnetic recording disc or floppy disc, the structure of an apparatus in which the jacket is installed while recording and/or reproducing signals on the disc, and the signal format to be recorded and so on. However, the prior art contains no disclosures concerning the operational functions of the recording and/or reproducing apparatus, particularly for utilizing the mentioned small floppy disc for the recording thereon of various types of information signals in a mixed sequence.

OBJECTS AND SUMMARY OF THE INVENTION

Accordingly, it is an object of this invention to provide an improved still image recording and/or reproducing apparatus.

Another object of this invention is to provide an improved still image recording and/or reproducing apparatus having various advantageous operational functions.

Another object of this invention is to provide a still image recording and/or reproducing apparatus in which a disc-shaped magnetic recording sheet is used as a recording medium and a plurality of still pictures recorded in respective concentric circular record tracks thereon can be sequentially reproduced in an order selectively designated by a user.

Still another object of this invention is to provide a still image recording and/or reproducing apparatus, as aforesaid, using a magnetic recording disc of 2-inch diameter and which has 50 concentric circular record tracks thereon.

Yet another object of this invention is to provide a still image recording and/or reproducing apparatus as aforesaid, which can operate in several modes such as a mode for recording a video signal of one field in one track, a mode for recording a video signal of one frame in two adjacent tracks, a mode for recording an audio signal of, for example, 10 seconds duration, in one track, and a mode for recording digital data in one track.

A further object of this invention is to provide a still image recording and/or reproducing apparatus in which successive track access, random track access and mixed combinations thereof may be programmed so as to be automatically employed in recording and then in playback so that a track access program function which is relatively simple and which is highly effective in practice can be realized.

A still further object of this invention is to provide a still image recording and/or reproducing apparatus in which a reproducing or playback head is moved in accordance with a programmed order to thereby sequentially reproduce information recorded in the selected tracks, and in which a previously executed program can be rechecked by interrupting the execution of the program and returning the program to an earlier step by a manual operation.

A still further object of this invention is to provide a still image recording and/or reproducing apparatus in which the recorded state or type of information signal recorded in each record track is judged from the output of the reproducing or playback head, an identifying signal corresponding to the recorded state of each recorded track is stored in a memory at an address corresponding to the respective recorded track, and the identifying signal corresponding to the recorded state stored in the memory is read out therefrom to display the recorded states of all the tracks simultaneously.

Yet a further object of this invention is to provide a still image recording and/or reproducing apparatus, as aforesaid, which can be applied to various fields, such as, educational, medical electronics, image presentation at trade shows, and advertisement in a shopping center and the like.

According to one aspect of the present invention, an apparatus for recording and/or reproducing different types of information signals in respective concentric circular record tracks on a magnetic recording disc, comprises spindle motor means for rotating the magnetic recording disc at a predetermined speed, transducer means for contacting the magnetic recording disc when recording and/or reproducing the information signals in the respective record tracks, transducer positioning means coupled to said transducer means for positioning the transducer means at a selected one of the record tracks, identification signal storing means for storing identification signals, preferably derived from the output of the transducer means, and respectively corresponding to said different types of information signals recorded in said respective record tracks, and display means coupled to said identification signal storing means for displaying simultaneously all of said identification signals corresponding to the types of information signals and also identifications of said respective record tracks in which said information signals are recorded.

According to another aspect of the present invention, an information recording and/or reproducing apparatus comprises spindle motor means for rotating a magnetic recording disc at a predetermined speed, transducer means for contacting said magnetic recording disc when recording and/or reproducing information signals in concentric circular record tracks on the discs, transducer positioning means coupled to said transducer means for positioning said transducer means on a selected one of said record tracks on the magnetic recording disc, control button means actuable to establish program sequences for said transducer positioning means, sequence memory means for storing sequence data corresponding to said program sequences established by said control button means, and program control means coupled to said sequence memory means for controlling said transducer positioning means in sequence in accordance with said sequence data stored in said sequence memory means.

The above, and other objects, features and advantages of the present invention, will become apparent from the following detailed description of a preferred embodiment which is to be read in conjunction with the accompanying drawings, throughout which the same reference numerals designate like elements and parts.

BRIEF DESCRIPTION OF THE DRAWINGS

FIG. 8 (formed of FIGS. 8-I and 8-II appearing on two sheets to permit the use of an adequately large scale) is a flow chart to which reference will be made in explaining how the program controller shown in FIG. 4 is employed for creating a user-established playback program;

DESCRIPTION OF THE PREFERRED EMBODIMENT

Figure 1:
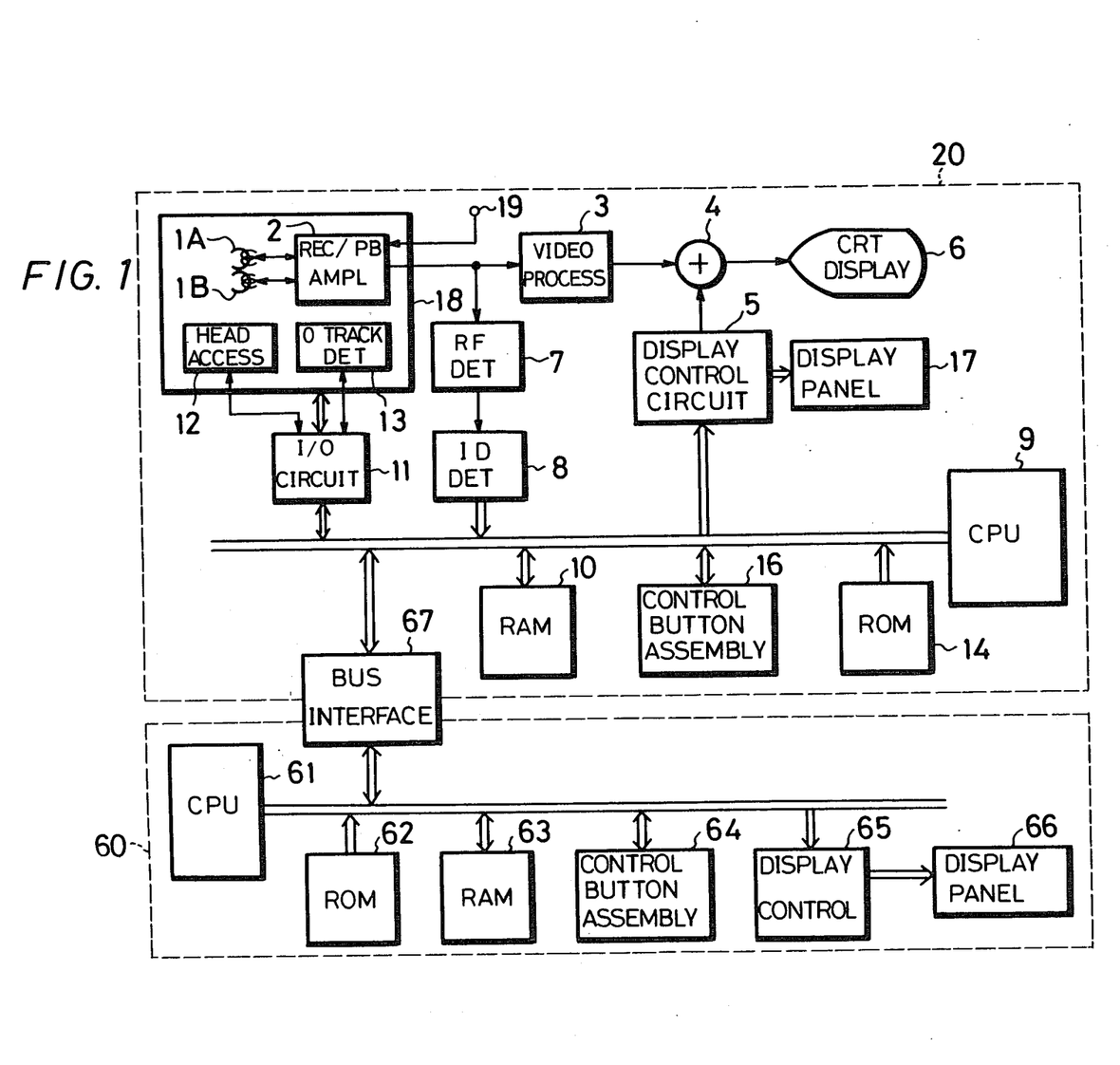
FIG. 1 is a schematic block diagram showing a circuit arrangement of a still image recording and/or reproducing apparatus according to an embodiment of the present invention.

Referring in detail to FIG. 1, it will be seen that a still image recording and/or reproducing apparatus according to an embodiment of this invention generally comprises a recording and/or reproducing apparatus 20 which carries out the basic recording and/or reproducing and a program controller 60.

Figure 3:
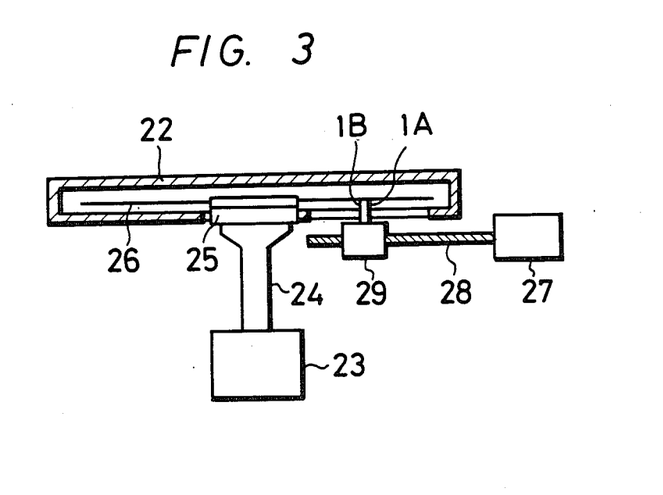
FIG. 3 is a schematic side elevational view, partly in cross-section of a disc drive included in the recording and/or reproducing apparatus according to the invention.

The recording and/or reproducing apparatus 20 is shown to include recording and/or reproducing heads 1A and 1B which are arranged to be movable together in the radial direction of a disc-shaped magnetic record medium or sheet 26 (shown in FIG. 3) having, for example, 50 concentric circular record tracks. A recording and/or reproducing amplifier 2 amplifies the signals recorded or reproduced by heads 1A and 1B. The reproduced signal from the recording and/or reproducing amplifier 2 is processed by a video processor 3 and then fed to one input terminal of an adder 4, in which it is added to a track information signal applied to another input terminal of adder 4 from a display control circuit 5 and then displayed on a cathode ray tube (CRT) display 6.

A radio frequency (RF) detecting circuit 7 is used to detect an RF signal from the reproduced output of the recording and/or reproducing amplifier 2. A recording signal identification (ID) detecting circuit 8 is provided to detect, on the basis of the output from RF detecting circuit 7, the nature of the information signal being reproduced from a track or tracks of record disc 26, that is, whether it is a still video image recorded as a field information signal in one track, or recorded as a frame information signal in two adjacent tracks, or digital data information, or audio information, and the like.

Signals identifying the type or nature of the information recorded in each track are output from the recording signal ID detecting circuit 8 and stored in a random access memory (RAM) 10 in accordance with a control operation effected by a central processing unit (CPU) 9.

A head access control circuit 12 is controlled by CPU 9 through an input/output I/O circuit 11. The head access control circuit 12 is used to control a motor 27 (FIG. 3) which drives recording and/or reproducing heads 1A and 1B in the radial direction. A zero track position detecting circuit 13 is used to detect an initial or zero track which is accessed by the heads.

The heads 1A and 1B are spaced in the radial direction of disc 26 so as to scan adjacent tracks on the disc. Only one head, for example, the head 1A is made operative when recording or reproducing an information signal which is recorded in only one track, for example, a field information signal, an audio information signal or a digital data information signal. However, when recording or reproducing a frame information signal in two adjacent tracks, head 1A is made operative during one revolution of disc 26 and, without changing the positions of the heads, head 1B is made operative during the next revolution of the magnetic recording disc.

Programs used to control the recording and/or reproducing apparatus 20 are stored in advance in a read only memory (ROM) 14.

As illustrated in FIG. 1, recording and/or reproducing heads 1A and 1B, zero track position detector circuit 13 and head access control circuit 12 are included in a disc drive 18. In the recording mode, a signal to be recorded is applied through a terminal 19 and through recording and/or reproducing amplifier 2 to recording and/or reproducing heads 1A and 1B.

The disc drive 18 is controlled by CPU 9 through I/O circuit 11 in response to operation of a selected function control button included in a control button 16 assembly (FIG. 1) provided on the front panel of the recording and/or reproducing apparatus 20, as hereinafter described in detail. Further, a display panel 17 provided on the front panel of recording and/or reproducing apparatus 20 is controlled by CPU 9 through display control circuit 5.

Figure 2:
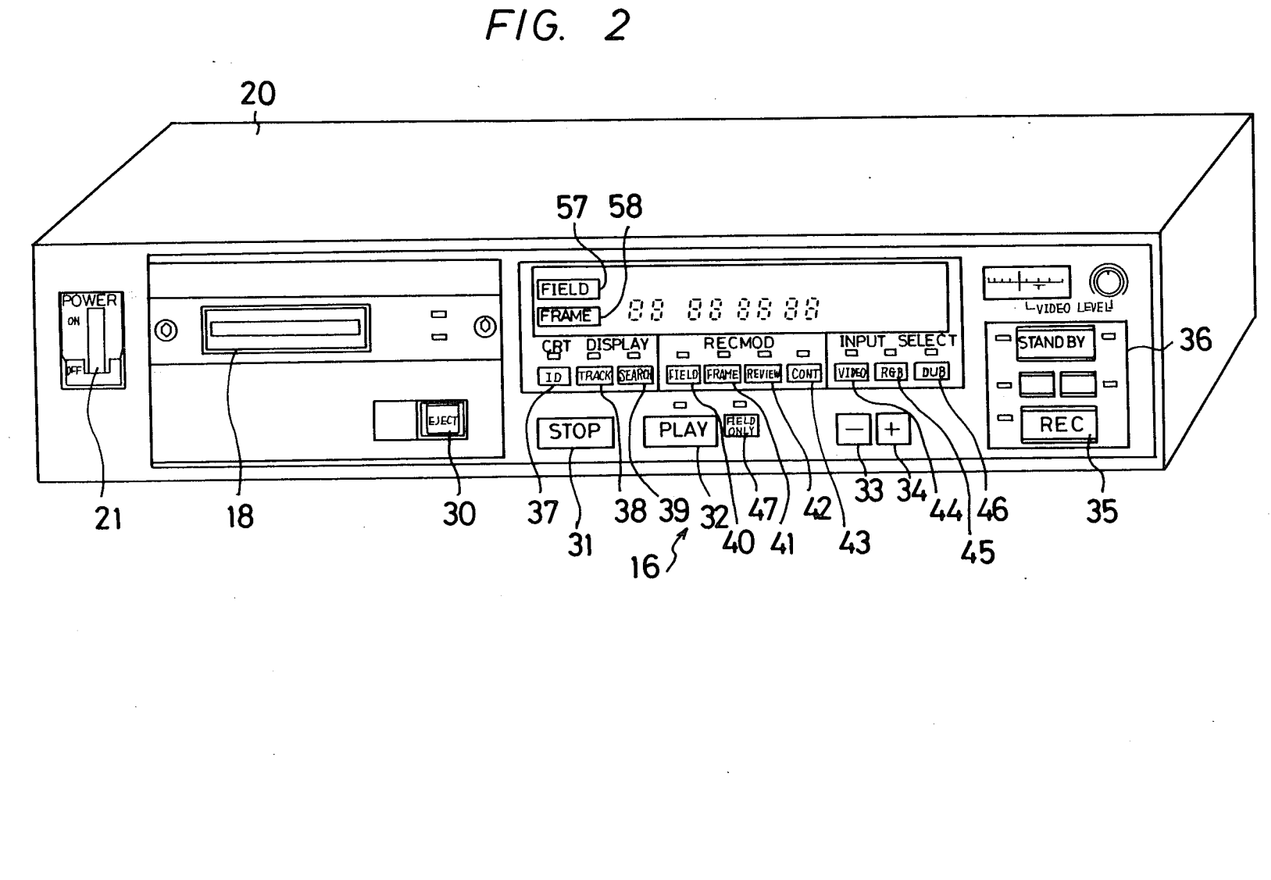
FIG. 2 is a perspective view of a still image recording and/or reproducing apparatus according to the present invention and particularly showing the arrangement of its control panel.

Referring now to FIG. 2, it will be seen that, in the recording and/or reproducing apparatus 20, a power switch button 21 is provided at the front of the housing adjacent the disc drive 18. As shown on FIG. 3, disc drive 18 includes a spindle motor 23 to which a shaft 24 is coupled. A disc table 25 is attached to shaft 24, and is adapted to have the magnetic sheet disc 26 installed thereon while contained in a disc jacket 22. A head access motor 27 for moving the heads 1A and 1B in the radial direction of the magnetic sheet disc 26 is coupled to a lead screw 28 which is threadably engaged with a head support base 29 on which recording and/or reproducing heads 1A and 1B are attached.

Referring again to FIG. 2, it will be seen that the control button assembly 16 arranged on the front panel of recording and/or reproducing apparatus 20 includes an eject (EJECT) button 30 which is actuable to eject the disc jacket 22 together with the magnetic sheet disc 26 (FIG. 3) from disc drive 18. Also provided in the control button assembly 16 on the front panel of apparatus 20 are a stop (STOP) button 31, a play (PLAY) button 32, minus (−) and plus (+) buttons 33 and 34 which are used to move the head position back and forth, respectively, a recording (REC) button 35 and a standby (STANDBY) button 36.

Reference numerals 37, 38 and 39 designate respective display control (CRT DISPLAY) buttons. More specifically, such display control buttons include an identification (ID) button 37, a track (TRACK) button 38 and a search (SEARCH) button 39. Reference numerals 40, 41, 42 and 43 designate respective buttons used in the recording mode and which include a field (FIELD) button 40, a frame (FRAME) button 41, a review (REVIEW) button 42 and a continuous (CONT) button 43.

In the recording mode, when the field button 40 is depressed, the recording information is recorded in a field recording manner, whereas, when frame button 41 is depressed, the recording signal is recorded in a frame recording manner in a pair of adjacent tracks by means of heads 1A and 1B in succession as earlier mentioned.

When review button 42 is depressed, the recording of information in the track being presently scanned is halted, and the apparatus is immediately changed-over to its reproducing or playback mode to reproduce the signal recorded in that same track. When the continuous button 43 is depressed, the head 1A records information continuously in one track after the other in succession until button 43 is released.

Reference numerals 44, 45 and 46 designate input selection buttons which include a video input button 44, an RGB-signal input button 45 and a dubbing input button 46. Reference numeral 47 designates a compulsory field (FIELD ONLY) button which is depressed when the user wishes to playback a recorded image in a field manner even if it had been recorded in a frame manner. Thus, when compulsory field button (FIELD ONLY) 47 is depressed, the state of the memory is neglected and the apparatus is placed in the playback mode with all information being reproduced in the field reproducing mode.

Referring again to FIG. 1, it will be seen that program controller 60 is operated by a central processing unit (CPU) 61 in accordance with the system program written in a ROM 62. A user program can be stored in a RAM 63 as hereinafter described in detail. A control button assembly 64 is provided on the front panel of the program controller 60 for selectively providing the various functions of the latter. Further, a display panel 66 is provided on the front panel and is controlled by CPU 61 through a display controller 65. The recording and/or reproducing apparatus 20 and the program controller 60 are electrically coupled through a bus interface 67 included in a cable.

Figure 4:
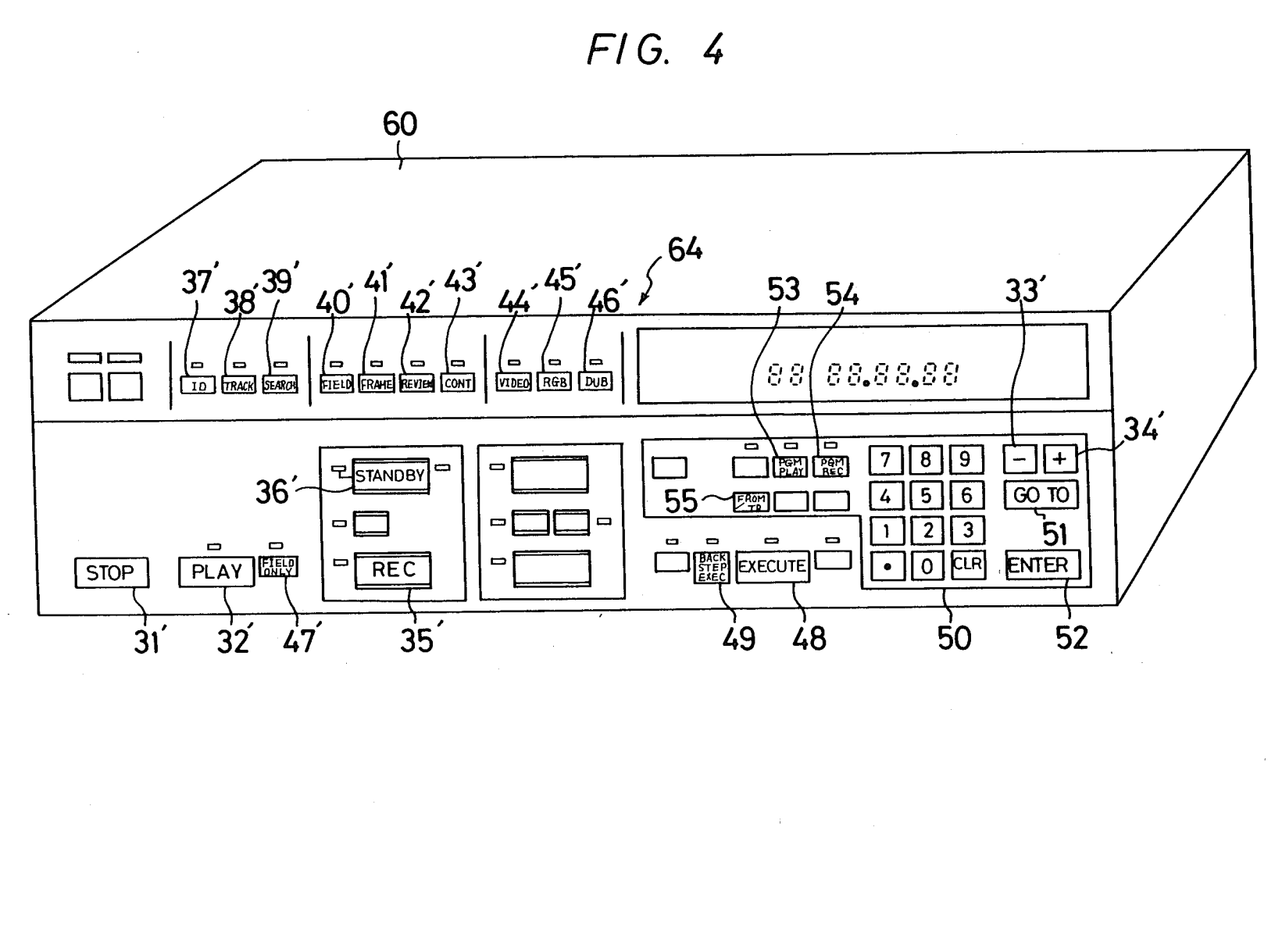
FIG. 4 is a perspective view of a program controller provided in accordance with the present invention and particularly showing the arrangement of its control panel.

As shown on FIG. 4, the control button assembly 64 on the front panel of program controller 60, includes a stop (STOP) button 31', a play (PLAY) button 32', a minus (−) button 33', a plus (+) button 34', a recording (REC) button 35', a standby (STANDBY) button 36', an ID (identification) button 37', a track (TRACK) button 38', a search (SEARCH) button 39', a field (FIELD) button 40', a frame (FRAME) button 41', a review (REVIEW) button 42', a continuous (CONT) button 43', a video input (VIDEO) button 44', an RGB input button 45', a dubbing input (DUB) button 46' and a compulsory field (FIELD ONLY) button 47'. These buttons 31' to 47' have exactly the same functions as the correspondingly numbered buttons, 31 to 47 described above in connection with the panel of apparatus 20 in FIG. 2.

Further, there are provided on the panel of program controller 60, a program execute button (EXECUTE) 48, a back step (BACK STEP) button 49 which is used to step back the program, a key pad comprised of ten keys 50, a head direct access "go to" button (GO TO) 51 and an enter button (ENTER) 52 which are used to write the user-established program.

The operation of the recording and/or reproducing apparatus 20 will now be described starting with the assumption that whether or not the magnetic recording sheet disc 26 has been previously used is not known. If magnetic sheet disc 26 has been used, it is desirable to know what kind or type of information is recorded thereon and whether or not a vacant track or tracks remain for recording of additional information. Accordingly, as shown in the flow chart of FIG. 5, initially power is turned ON by actuation of power source switch button 21 (FIG. 2) of the recording and/or reproducing apparatus 20. Then, at step 1, it is detected whether or not a disc jacket 22 is inserted in disc drive 18 (FIG. 2). If a disc jacket 22 is not inserted into disc drive 18, step 1 is repeated. When a disc jacket 22 is inserted into disc drive 18, the program proceeds to step 2 in which the magnetic sheet disc 26 in the jacket 22 is loaded in respect to table 25 of the disc drive 18 in recording and/or reproducing apparatus 20. After magnetic sheet disc 26 is loaded, the program passes to step 3 for enactment of the sub-routine hereinafter described with reference to FIG. 7, and in which generally an RF signal is automatically searched for, the RF signal is detected by RF detector circuit 7 and the type or nature of the recorded information is detected by recording signal ID detector circuit 8 and then stored in RAM 10.

Figure 6:
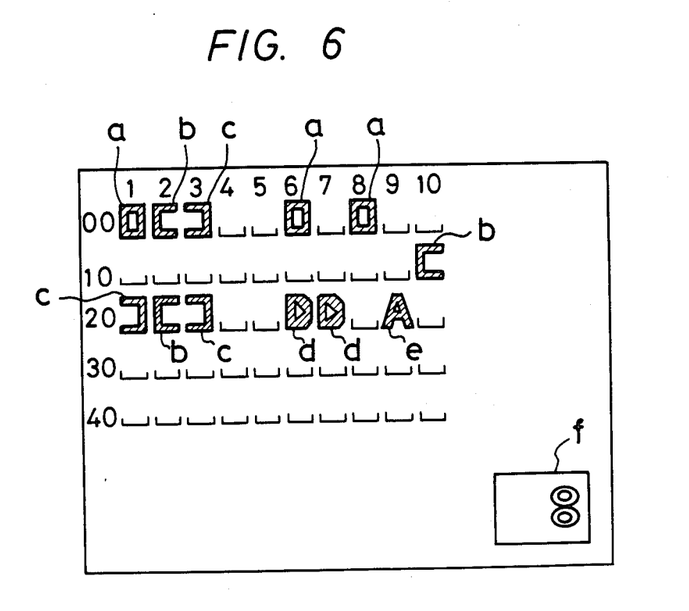
FIG. 6 is a schematic representation of an example of a display presented on a CRT (cathode ray tube) display in the apparatus according to the present invention.

In the next step 4, it is detected whether or not search button 39 (FIG. 2) is depressed. If search button 39 is not depressed, step 4 is repeated. When search button 39 is depressed, the program proceeds to step 5 in which the ID information stored in RAM 10 are read out under the control of CPU 9 and displayed on CRT display 6 (FIG. 1), as shown in FIG. 6. In FIG. 6, each symbol a represents a track on which field information was recorded. Thus, in the example illustrated on FIG. 6, field information is recorded on each of the 1st, 6th and 8th tracks. In other words, each of these enumerated tracks has recorded therein a video signal of one field. Symbols b and c respectively represent tracks on which frame information has been recorded. In other words, a video signal of one frame, or two fields, is recorded in two adjacent tracks on disc 26 by heads 1A and 1B, respectively, operating in succession without movement of head support base 29. In the example illustrated on FIG. 6, frame information is shown to be recorded in the paired 2nd and 3rd tracks, 20th and 21st tracks, and 22nd and 23rd tracks. Symbol d represents a track on which digital information is recorded and symbol e represents a track on which audio information is recorded. Thus, in the example shown on FIG. 6, digital data information is recorded in the 26th and 27th tracks and audio information is recorded in the 29th track, while the remaining tracks are vacant, that is, tracks on which nothing is recorded.

Figure 5:
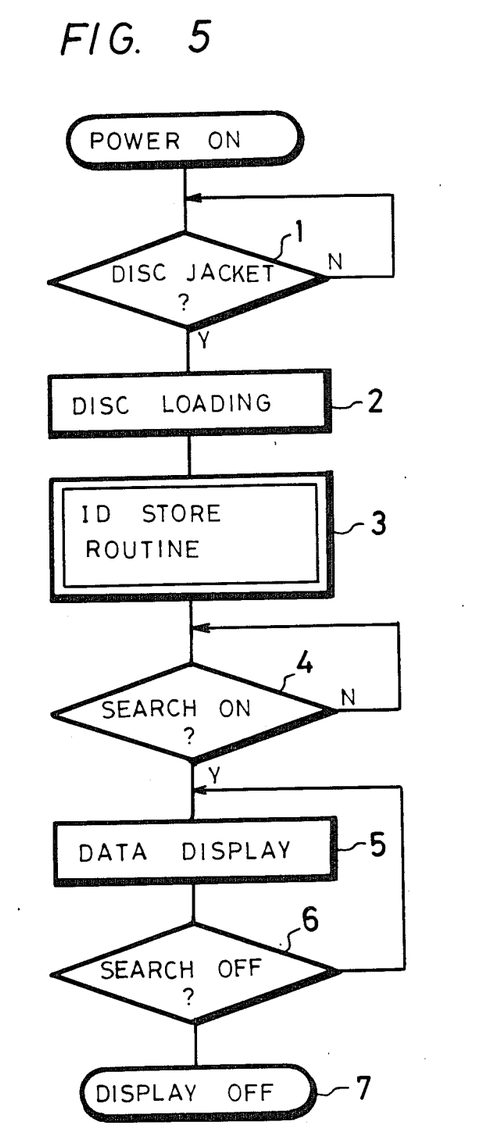
FIG. 5 is a flow chart to which reference will be made in explaining the operation of the recording and/or reproducing apparatus shown in FIG. 2.

Returning to the flow chart of FIG. 5, after display of the ID information in step 5, it is detected in step 6 whether or not search button 39 is released or no longer depressed. If the search button 39 is not released, step 5 is repeated, that is, the display of ID information on CRT display 6 is continued. If search button 39 is released, the program goes to step 7 at which the display by the CRT display 6 is terminated.

Figure 7:
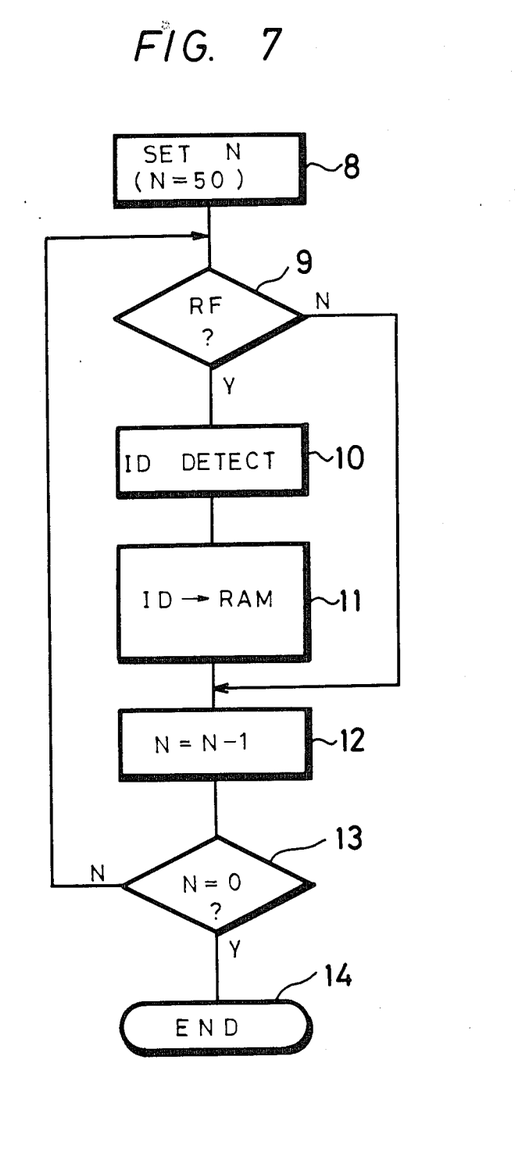
FIG. 7 is a flow chart showing a sub-routine included in the flow chart of FIG. 5.

Referring now to FIG. 7, it will be seen that, in the sub-routine of step 3 in FIG. 5, a predetermined track N, for example, the 50th track is designated at step 8. Then, RF detector circuit 7 (FIG. 1) detects at step 9 whether or not an RF signal is recorded in the 50th track. If an RF signal is recorded, the program goes to step 10 at which recording signal ID detector circuit 8 determined whether such RF signal is field information, frame information, digital data information, audio information or the like. Then, at step 11, data identifying the type of information recorded in the 50th track, that is, an ID signal, is stored in RAM 10 (FIG. 1) under the control of CPU 9 (FIG. 1).

Subsequently, the program goes to step 12 at which the next track N=N-1, that is, the 49th track is designated. Of course, if it was detected at step 9 that no RF signal is recorded in the 50th track, the program goes immediately to step 12. Then, the program goes to step 13 at which it is checked whether or not N=0 is established, that is, whether the zero track is being detected. If N=0 is not established, the program goes back to step 9 to repeat the operations described above. When N=0 is established finally, that is, when all of the tracks from the 50th track to the 1st track have been checked for the recording of an RF signal therein, the program goes to step 14 at which the operation of this sub-routine is ended.

When the ID button 37 (FIG. 2) is depressed with the apparatus in the recording mode or standby mode, the ID signal identifying the type of information to be recorded is displayed as the respective symbol on CRT display 6 (FIG. 1). In the reproducing or playback mode, depression of the ID button 37 causes the ID signal corresponding to the information recorded in the track of the magnetic sheet disc 26 which is being reproduced to be displayed on the CRT display 6. Further, when track button 38 (FIG. 2) is depressed, in either the recording mode, standby mode or playback mode, the number of the track being scanned by the operative head IA or IB is displayed on CRT display 6, as indicated at f on FIG. 6. Of course, when search button 39 (FIG. 2) is depressed, the searched results, that is, symbols indicating the types of information, if any, recorded in all of the tracks, are simultaneously displayed on the CRT display 6, as described above.

The normal operating procedure in the recording mode will now be described with reference to FIGS. 1 to 4. Initially, power switch button 21 is depressed and disc jacket 22 is inserted into disc drive 18. When disc jacket 22 has been inserted into disc drive 18, the RF signals recorded in one or more tracks are automatically searched for and vacant track information is stored in memory 10. Then, the operative one of the heads 1A or 1B is moved to the track address at which the information is to be recorded. For moving the head one track at a time in the direction toward the inner periphery of magnetic sheet disc 26, plus button 34 is depressed once for each track, whereas, for moving the head one track at a time in the direction toward the outer periphery of disc 26, the minus button 33 is depressed once for each track. When movement to the track to be recorded has been completed, if standby button 36 is depressed, the recording and/or reproducing apparatus 20 is placed in the standby mode. Thereafter, by depressing recording button 35, the recording and/or reproducing apparatus 20 is set in the recording mode. After the desired recording has been completed, depressing stop button 31 causes the standby mode to be released. When play button 32 is depressed, the recording and/or reproducing apparatus 20 is placed in the playback mode directly. When eject button 30 is depressed, disc jacket 22 with disc 26 therein is ejected from disc drive 18.

The operating procedure in the reproducing mode will now be described. First, power switch button 21 is depressed and then disc jacket 22 is inserted into disc drive 18. Thereafter, play button 32 is depressed and, as a result, recording and/or reproducing apparatus 20 is set in the playback mode to reproduce information recorded in the track at which a head is now situated and a play lamp (not shown) is lit. When a track in which field information is recorded is being reproduced, a field lamp 57 (FIG. 2) is lit to indicate that fact, whereas, when frame information is being reproduced by heads 1A and 1B in succession from a pair of adjacent tracks, a frame lamp 58 is lit. In the reproducing mode, the lamps 57 and 58 are automatically changed-over by the respective ID signal contained in the RF signal being reproduced from a tack. The head may be moved from one track to another track which is to be reproduced. When plus button 34 or minus button 33 is continuously depressed, the head is moved at a predetermined speed per track to the first track in which information is recorded and the head is then moved to the second track and the following tracks containing recorded information at a predetermined speed higher than the speed of movement to the first track so that a picture search can be made on the picture or video screen of CRT display 6.

When the desired reproducing or playback is ended, stop button 31 is depressed to establish the stop mode in which spindle motor 23 is made inoperative and the heads are released from contact with magnetic sheet disc 26.

The operations involved in a programmed playback using program controller 60 will now be described. First, a playback program is established by the user in accordance with the program illustrated by the flow chart shown in FIG. 8, and which is initiated by depressing momentarily a program play (PGM PLAY) button 53 in program controller 60 (FIG. 4). Whether or not program play button 53 is depressed is detected by CPU 61 at step 1. If program play button 53 is not depressed, step 1 is repeated. If program play button 53 is depresseds, the program goes to step 3 at which CPU 61 (FIG. 1) checks whether or not a from/to (FROM/TO) button 55 (FIG. 4) is depressed. If from/to button 55 is not depressed, the program goes to step 4, at which CPU 61 checks whether or not a track number X is signified by selective actuation of keys 50 (FIG. 4). If none of keys 50 are depressed, the program goes back to step 3. If, on the other hand, one or more keys 50 are depressed, the corresponding track number X is stored in RAM 63 (FIG. 1) at step 5.

Figures 1, 8:
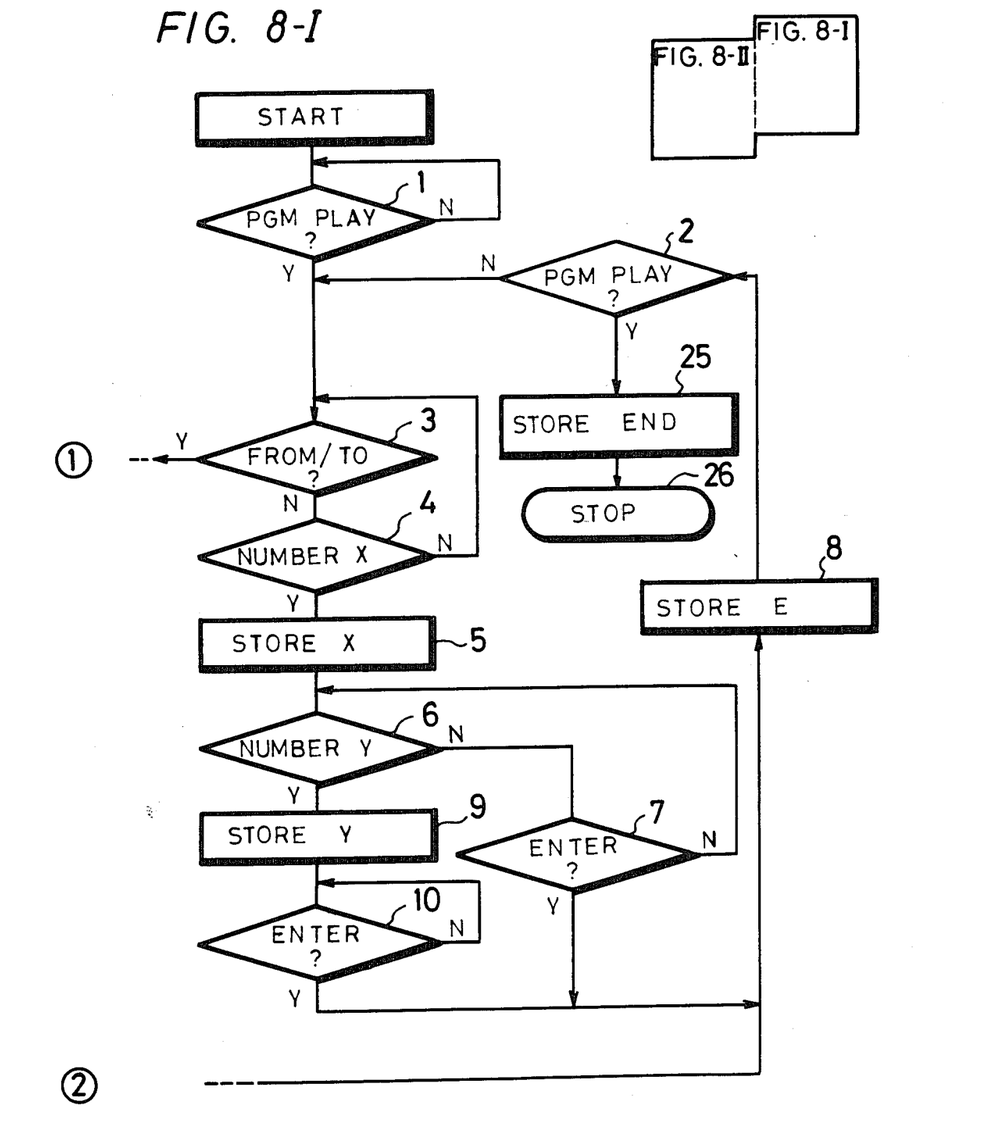
Figures 2, 8:
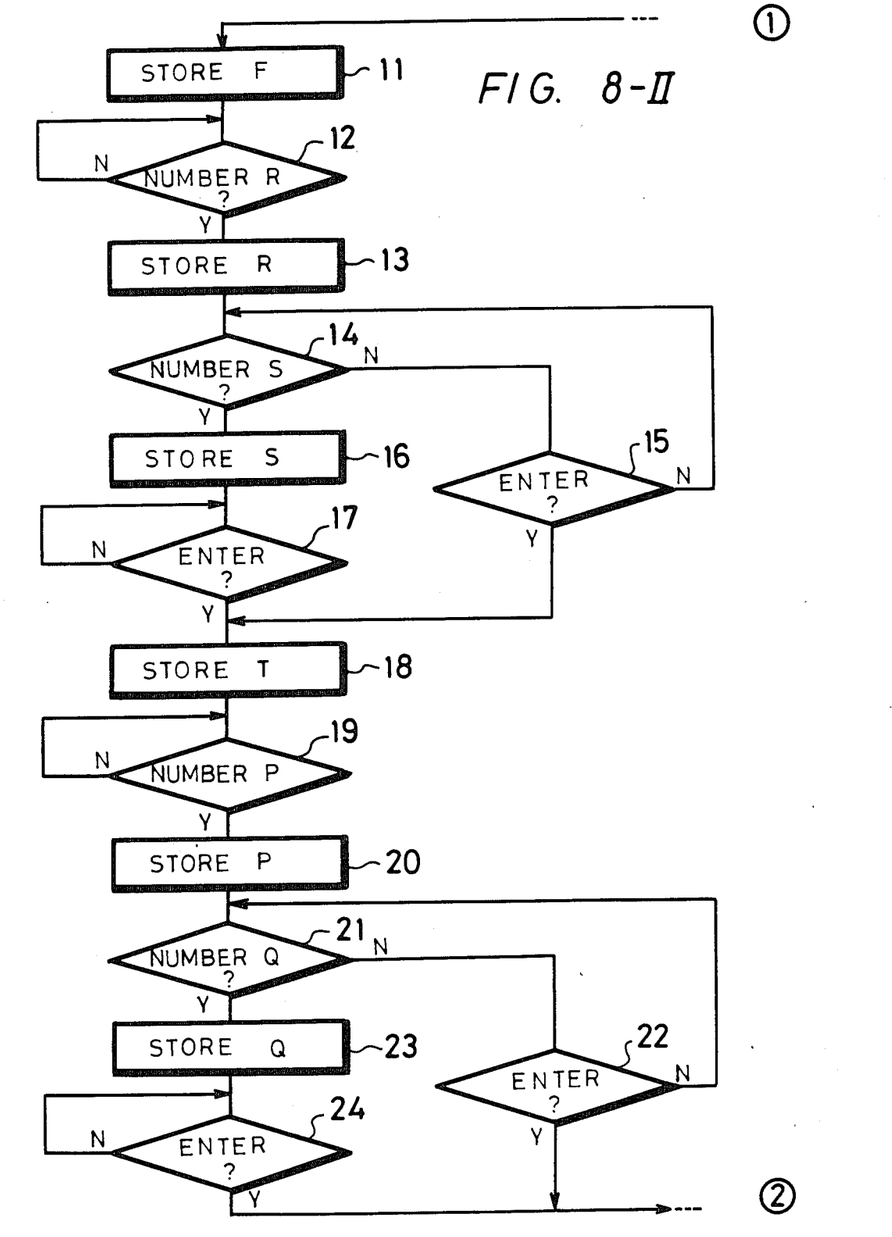

Then, the program goes to step 6 at which CPU 61 checks whether or not a track number Y is signified by selective actuation of keys 50 (FIG. 4). If none of keys 50 are depressed, the program goes to step 7, at which CPU 61 checks whether or not enter button 52 is depressed. If enter button 52 is not depressed, the program goes back to step 6. If enter button 52 is depressed, a letter E signifying that enter button 52 is depressed is stored in RAM 63 (FIG. 1) at step 8 and then the program goes to step 2 at which CPU 61 checks if program play (PGM PLAY) button 53 is again depressed to signify the program end. If program play button 53 is not again depressed, the program goes back to step 3. In other words, the series of operations represented by steps 3 to 8 constitutes a program for effecting random track access and by which a certain track, identified by the number X of one digit, is set and stored in RAM 63.

However, if at step 6 track number Y is signified by suitable depression of keys 50, and track number Y is stored in RAM 63 (FIG. 1) at step 9. Then, at step 10, CPU 61 checks whether or not enter button 52 is depressed. If enter button 52 is not depressed, step 10 is repeated until it it depressed. When enter button 52 is depressed, the program goes to step 8 at which the letter E indicating that enter button 52 is depressed is stored in RAM 63 and the program goes back to step 2. Therefore, when the program goes through steps 6,9 and 10, this means that numbers X and Y representing a track number of two digits have been set in the course of making the program.

If from/to button 55 is found to be depressed at step 3, letter F for indicating the first word of "from/to" is stored in RAM 63 at step 11. Then, the program goes to step 12 at which CPU 61 checks whether or not a track number R is selected by suitably depressing keys 50. If keys are not depressed for selecting track number R, step 12 is repeated. When track number R is selected by depression of keys 50, that track number R is stored in RAM 63 at step 13.

Then, the program goes to step 14 at which CPU 61 checks whether or not a track number S has been selected by suitably depressing keys 50. If a track number S is not selected, the program goes to step 15 at which CPU 61 checks whether or not enter button 52 is depressed. If enter button 52 is not depressed, the program goes back to step 14. If enter button 52 is depressed, the program goes to step 18 at which the letter T for indicating the last word of "from/to" is stored in RAM 63. In other words, in the series of operations from step 11 to 18, a certain track number comprised of a single digit R is designated as the starting point of the "from/to" in the course of making a program involving continuous track accessing.

If the track number S is selected by depressing keys 50 at step 14, track number S is stored in RAM 63 at step 16. Then, at step 17, CPU 61 checks whether or not enter button 52 is depressed. If button 52 is not depressed, step 17 is repeated. If, on the other hand, enter button 52 is depressed, the program goes to step 18 at which the letter T indicating the end of the "from/to" is stored in RAM 63. In other words, in the course of executing the program through steps 14,16 and 17, a track identified by two digits or numbers R and S is identified as the starting point for the desired "from/to" or continuous series of tracks to be played back in sequence.

Subsequently, the program goes to step 19 at which CPU 61 checks whether or not a track number P has been selected by suitable actuation of keys 50. If a track number P is not selected, step 19 is repeated. If, on the other hand, keys 50 have been selectively depressed, the respective track number P is stored in RAM 63 at step 20. Then, the program goes to step 21 at which CPU 61 checks whether or not a track number Q is selected by suitable actuation of keys 50. If a track number Q is not selected, the program goes to step 22 at which CPU 61 checks whether or not enter button 52 is depressed. If the enter button 52 is not depressed, the program goes back to step 21. If, on the other hand, enter button 52 is depressed, the program returns to the above mentioned step 8. At step 8, the letter E indicating that enter button 52 is depressed is stored in RAM 63, and then the program goes back to step 2. In other words, the operations from steps 19 to 22 set a certain track number P comprised of a single digit as the end position of the "from/to" program for continuously accessing the tracks.

If a track number Q is selected by suitably actuating keys 50 at step 21, the track number Q is stored in RAM 63 at step 23. Then, the program goes to step 24 at which CPU 61 checks whether or not the enter button 52 is depressed. If the enter button 52 is not depressed, step 24 is repeated. If, on the contrary, enter button 52 is depressed, the program goes to step 8. Therefore, the operations of steps 21,23 and 24 set a particular track number comprised of the two digits or numbers P and Q as the end point of the "from/to" program in which the tracks are continuously accessed one after the other.

Finally, the program goes back to step 2 at which, if program play (PGM PLAY) button 53 (FIG. 4) is again depressed to signify the end of the user-established playback program, the program goes to step 25. At step 25, a mark END for indicating that program play button 53 is again depressed, that is, for indicating the end of the user playback program, is stored in RAM 63 and the operations for establishing that program are ended.

By way of example, the operations for creating a mixed playback program in which the randomly arranged track numbers "5", "17" and "12", the sequential track numbers "13" to "25" and the randomly arranged tracks numbers "30", "45" and "1" are to be played back or reproduced in that order will be described with reference to the flow chart of FIG. 8. After passing through steps 1 and 3, the program goes to step 4 at which the one of keys 50 corresponding to track number "5" is depressed, and then, at step 5, "5" is stored in RAM 63. Since a track number is not designated at step 6, the program goes to step 7 at which enter button 52 is depressed and the letter E is stored in RAM 63 at step 8 and then, the program goes back to step 2. Since program play button 53 is not again depressed at this time, the program goes through step 3 to step 4, at which depression of the one of keys 50 signifying number "1" is detected to signify the second digit of track number "17" and at step 5, "21" is stored in RAM 63. Further, the one of keys 50 representing number "7" is depressed at step 6 to signify the first digit of track number "17" and, at step 9, "7" is stored in RAM 63. At step 10, enter button 52 is depressed to thereby store letter "E" in RAM 63 and thereafter, the program again goes back to step 2. Similar operations are performed for entering track number "12" in RAM 63.

Subsequently, from/to button 55 is depressed at step 3 and the letter F is stored in RAM 63 at step 11. At step 12, the one of keys 50 representing number "1" is depressed to signify the second digit of track number "13" and "1" is stored in RAM 63 at step 13. Further, at step 14, the one of keys 50 representing number "3" is depressed to signify the first digit of track number "13" and "3" is stored in RAM 63 at step 16. At step 17, enter button 52 is depressed and, at step 18, the letter T is stored in RAM 63.

Then, at step 19, the one of keys 50 representing the number "2" is depressed to signify the second digit of the track number "25" and, at step 20, "2" is stored in RAM 63. Further, at step 21, the one of keys 50 representing the number "5" is depressed to signify the first digit of the track number "25" and "5" is stored in RAM 63 at step 23. At step 24, enter button 52 is depressed and, at step 8, the letter E is stored in RAM 63 and the program goes back to step 2.

At step 4, the one of keys 50 representing the number "3" is depressed to signify the second digit of track number "30" and, at step 5, "3" is stored in RAM 63. Further, at step 6, the one of keys 50 representing "0" is depressed to signify the first digit of track number "30" and, at step 9, "0" is stored in RAM 63. Then, at step 10, enter button 52 is depressed and, at step 8, the letter E is stored in RAM 63. Thereafter, the program goes back to step 2.

For the track numbers 37 45" and "1", similar operations will be carried out. Thereafter, at step 2, program play button 53 is again depressed to signify the program end and, at step 25, the mark END is stored in RAM 63 whereupon the programming operations are ended.

Thus, in the program register (not shown) of RAM 63, there is stored data representing the user-established playback program [5E17E12EF13T25E30E45E1E END], that is, the mixed program created above.

Figure 9:
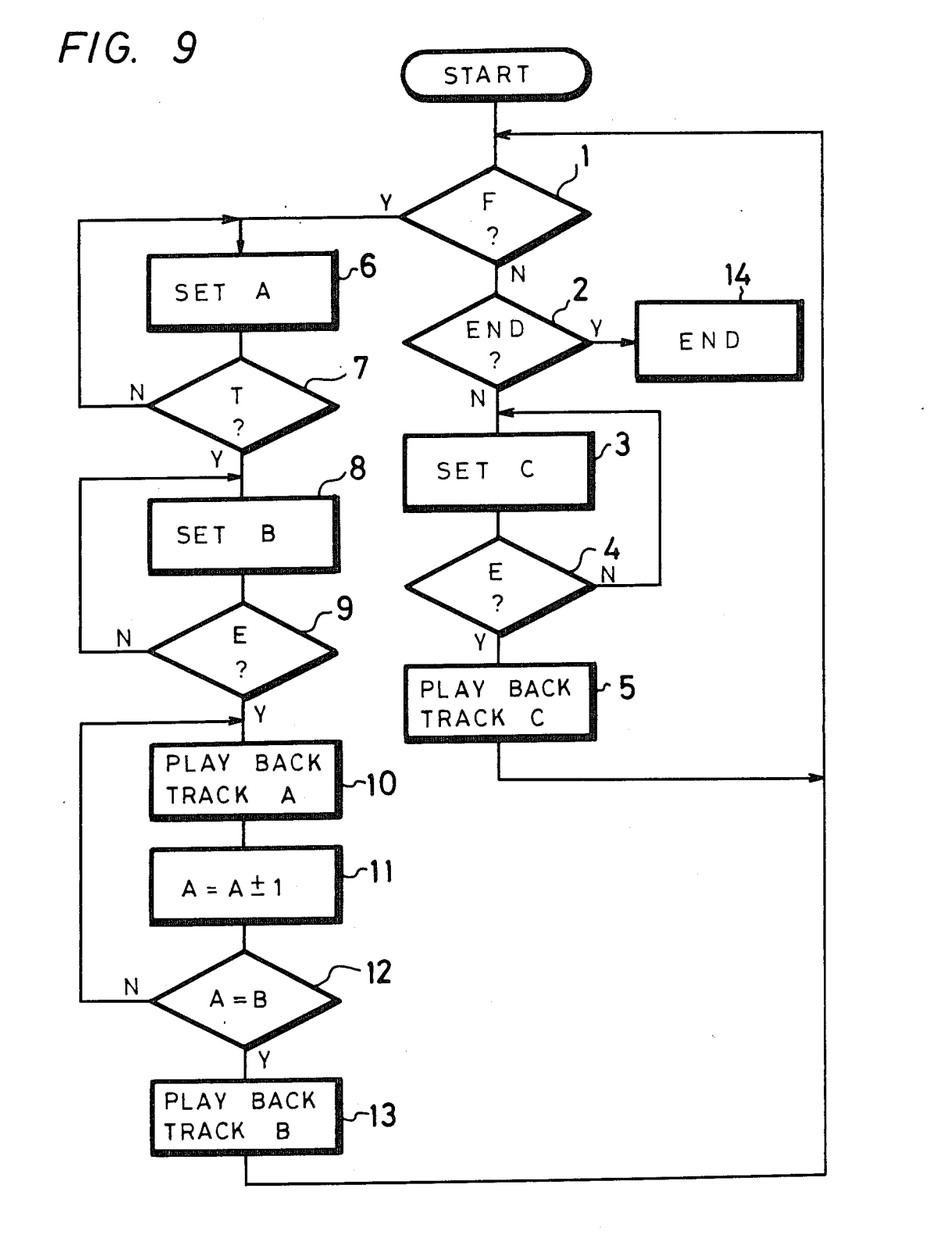
FIG. 9 is a flow chart to which reference will be made in explaining the execution of a mixed program stored in a random access memory.

The execution of the above mixed playback program stored in RAM 63 will now be described with reference to the flow chart of FIG. 9. After the program starts, at step 1, CPU 61 checks whether or not the user-established playback program starts with F, that is, whether or not the program initially calls for continuous track accessing. If not, the program goes to step 2 at which CPU 61 checks whether or not END has been reached or detected in the stored program. If END is not detected, the program goes to step 3 in which the track number C, for example, the track number "5" in the above described example, is set. At step 4, CPU 61 checks whether or not E follows track number C. If E is not detected in step 4, the program goes back to step 3. If, on the other hand, E is detected, the program goes to step 5 at which head access motor 27 is suitably operated to access track number C, and the information recorded in track number "5" is reproduced in the program playback mode.

After playback of the information recorded in track number C is completed, the program goes back to step 1 and the operations described with reference to steps 2-5 will be repeatedly executed with respect to track numbers "17" and "12". Thus, the programmed playback of the randomly selected tracks "5", "17" and "12" is sequentially executed.

After the playback of track "12", when the letter F is detected at step 1, the program goes to step 6. At step 6, the track number in the user-established playback program which defines the starting point of the "from/to" or continuous track accessing, that is, the track number "13" in the above mentioned example, is set. To be more specific, the number "1" corresponding to the second digit of track number "13" is set first at step 6. Then, at step 7, CPU 61 checks whether or not the letter T is next detected in the program. If it is not detected, the program goes back to step 6 at which the number "3" corresponding to the first digit of track number "13" is set so that the complete track number "13" is finally set.

If, on the other hand, the letter T is detected at step 7, the program proceeds to step 8 at which the track number in the user-established program defining the end point of the "from/to" or continuous track accessing, that is, the track number "25" is set. More specifically, in this case, the number "2" corresponding to the second digit of track number "25" is first set at step 8 and then, at step 9, CPU 61 checks whether or not "2" is followed by E. If E is not detected at step 9, the program goes back to step 8 at which the number "5" corresponding to the first digit of track number "25" is set. Thus, track number "25" is set finally.

When E is detected at step 9, the information recorded in track number A, that is, in track number "13" is reproduced at step 10.

When the playback of track number A, that is, track number "13", is ended, the program goes to step 11 at which the information recorded in the next track of the "from/to" or continuous track accessing is reproduced. More particularly, at step 11, track number A±1 is accessed, that is, the information recorded in track number "14" is next reproduced. In step 11, the use of the symbols "+" and "−" indicates that the from/to may be in the direction of increasing track numbers or in the direction of decreasing track numbers. At step 12, CPU 61 checks whether the equality A=B is established or not, that is, whether or not the track now being reproduced is the final track of the from/to or continuous track accessing in the user-established playback program. If it is not the final track, the program goes back to step 10, and the above mentioned operations are repeated. Thus, in the example given above, information recorded in track numbers "13", "14", "15", . . . "25", is reproduced in sequence. When the equality A=B is established at step 12, that is, the accessed track number becomes track number "25", the program goes to step 13. At step 13, the information recorded in in track number B, that is, the final track number "25", is reproduced and, at the completion thereof, the program goes back to step 1.

Thereafter, with respect to tracks numbered "30", "45" and "1", and which follow the period of continuous track accessing, operations similar to those described above for the tracks numbered "5", "17" and "12" are executed. When finally END is detected at step 2, the program goes to step 14 at which the execution of the described user program is ended.

It will be appreciated that the program controller 60 has various operating functions that contribute to the user's convenience, and among which is a most effective function that will be described below.

More particularly, when for any reason it is desired to return to the playback of a preceding track in the midst of the user-selected playback program, the back step button 49 (FIG. 4) is depressed, and, in response thereto, the playback of the user-selected playback program is interrupted and the program is returned by a predetermined amount whereby a desired track can be searched or located immediately.

The above mentioned operation will be described with reference to the flow chart of FIG. 10 in which after the program is started, execution thereof is initiated by actuation of the program execution button 48 at step 1. Thereafter, at step 2, CPU 61 detects whether or not execute button 48 (FIG. 4) is depressed. If execute button 48 is not depressed, the program goes to step 3 at which CPU 61 checks whether or not plus button 34' (FIG. 4) is depressed. If plus button 34' is not depressed, the program goes to step 4 at which CPU 61 checks whether or not minus button 33' (FIG. 4) is depressed. If minus button 33' is not depressed, the program goes to step 5 at which CPU 61 checks whether or not stop button 31' (FIG. 4) is depressed. If stop button 31' is not depressed, the program goes to step 6 at which CPU 61 checks whether or not back step button 49 (FIG. 4) is depressed. If the back step button 49 is not depressed, the program goes to step 7 at which CPU 61 checks whether or not an interval timer (not shown) contained in CPU 61 has indicated the passage of a predetermined interval of time. If the predetermined interval of time has passed, the program goes to step 8 in which CPU 61 checks whether or not all programmed tracks included in the user-established playback program have been played-back. If the user-established playback program has not been ended, the program goes to step 9 and the playback program is advanced by one step. Then, the program of FIG. 10 goes to step 10 at which the interval timer in CPU 61 is reset and the program goes back to step 2 so as to repeatedly executed the above described operations.

Figure 10:
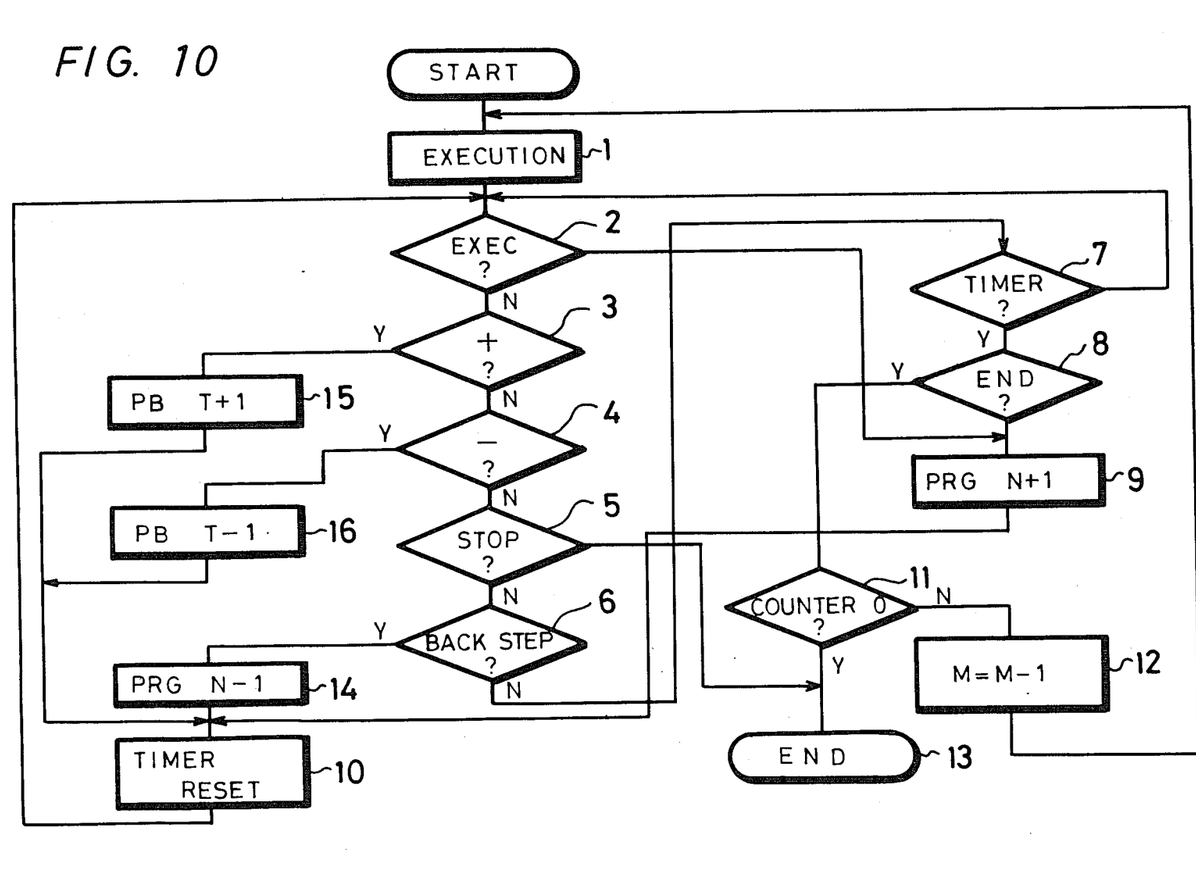
FIG. 10 is a flow chart showing operations of the program controller according to this invention and to which reference will be made in explaining one of the most advantageous functions thereof.

If it is decided, at step 8, that the user-established playback program is ended, the program of FIG. 10 goes to step 11 thereof at which a counter (not shown) in CPU 61 counts the number of times the user-established playback program has been performed or repeated, and further at which it is determined whether or not the resulting counted number is zero. If the counted number is not equal to zero, the counted value is decremented by one at step 12 and the program on FIG. 10 goes back to step 1 at which the above described operations are repeated. If, on the other hand, the counted value is equal to zero at step 11, the program goes to step 13 on FIG. 10 at which the execution of all operations is ended.

Further, if during the execution of the program of FIG. 10, it is detected at step 2 that the execute button 48 has been depressed again, thereupon, regardless of the state of the interval timer in CPU 61, the program of FIG. 10 goes to step 9. In other words, no matter what the normal interval of the program may be, the program can be advanced manually by depressing execute button 48.

While the program is being executed in response to depressing of execute button 48, if it is desired to reverse the advancement of the user-established playback program, back step button 49 is depressed so that such condition is detected at step 6. In other words, if back step button 49 is depressed one time at step 6, the program goes to step 14 at which the user-established playback program is executed one step in the reverse direction.

Further, if plus button 34' is depressed at step 3, the program goes to step 15 at which the information recorded in the immediately succeeding track can be searched. Similarly, if minus button 33' is depressed at step 4, the program goes to step 16 at which the information recorded in the immediately preceding track can be searched. In other words, if the back step button 49 is depressed, it is possible to return the user-established playback program by one step and to search the information recorded in the corresponding track, whereas, if minus button 33' or plus button 34' is depressed, the information recorded in the immediately preceding or succeeding track can be searched. When step 15 or 16 is ended, the program of FIG. 10 goes to step 10 at which the interval timer is reset. Thereafter, the program goes back to step 2 on FIG. 10 at which the above mentioned operations are repeated.

Furthermore, if stop button 31' is depressed at step 5, the program of FIG. 10 immediately goes to step 13 at which all operations are ended.

Although a single preferred embodiment of the invention has been described in detail above with reference to the drawings, it will be apparent that the invention is not limited to that precise embodiment, and that many modifications and variations could be effected therein by one skilled in the art without departing from the spirit or scope of the invention as defined by the appended claims.

What is claimed is:

1. Apparatus for recording and/or reproducing different types of information signals in respective concentric circular record tracks on a magnetic recording disc, and which different types of information signals include at least field recorded still image information contained in a respective one of said record tracks and frame recorded still image information contained in a respective pair of said record tracks which are adjacent each other on said disc, comprising:
spindle motor means for rotating the magnetic recording disc at a predetermined speed; transducer means for contacting said magnetic recording disc when recording and/or reproducing said information signals in said respective record tracks; transducer positioning means coupled to said transducer means for selectively positioning said transducer means in respect to said record tracks; identification signal storing means for storing identification signals respectively identifying different types of information signals recorded in said respective record tracks; and display means coupled to said identification signal storing means for displaying simultaneously all of said identification signals identifying the types of information signals along with identifications of said respective record tracks in which said types of information signals are recorded.

2. Apparatus as in claim 1; wherein said display means is a cathode ray tube display which functions to display said identification signals in the form of an identification table and which also displays said still image information when reproduced from the respective record tracks.

3. Apparatus as in claim 1; wherein said signals further include recorded audio information and recorded digital data recorded in respective ones of said record tracks, and said identification signals distinguish between said respective record tracks having said audio information and said digital data recorded therein and said record tracks having said still image information recorded therein.

4. Apparatus as in claim 3; in which said transducer means includes first and second heads spaced apart in a radial direction of said disc so as to scan adjacent record tracks on the latter; and in which only said first head is made operative when recording or reproducing said field recorded still image information, said audio information and said digital data in said respective ones of the record tracks and, when recording or reproducing frame recorded still image information in said respective pair of adjacent record tracks, said first head is made operative during one revolution of said disc and, without operation of said transducer positioning means, said second head is made operative during the next revolution of said disc.

5. Apparatus as in claim 1; further comprising control button means actuable to establish program sequences for said transducer positioning means, sequence memory means for storing sequence data corresponding to said program sequences established by said control button means, and program control means coupled to said sequence memory means for controlling said transducer positioning means in sequence in accordance with said sequence data stored in said sequence memory means.

6. Apparatus as in claim 5; wherein said program control means is operative to interrupt a program sequence and to recover a previous program step of said program sequence in response to operation of one of said control button means.

7. Apparatus as in claim 5; wherein said control button means includes at least ten keys and a serial track selection key, and said sequence data has mixed therein a random track selection sequence and a serial track selection sequence.

8. Apparatus as in claim 7; wherein said serial track selection sequence is defined by actuation of said serial track selection key after selection of a start track by selective actuation of said ten keys.

9. Information recording and/or reproducing apparatus comprising:
spindle motor means for rotating a magnetic recording disc at a predetermined speed; transducer means for contacting said magnetic recording disc when recording and/or reproducing information signals in concentric circular record tracks on the discs; transducer positioning means coupled to said transducer means for positioning said transducer means on a selected one of said record tracks on the magnetic recording disc; control button means actuable to establish program sequences for said transducer positioning means; sequence memory means for storing sequence data corresponding to said program sequences established by said control button means; and program control means coupled to said sequence memory means for normally controlling said transducer positioning means in sequence in accordance with said sequence data stored in said sequence memory means, said program control means being selectively operative to interrupt a program sequence and to recover a previous program step of said program sequence in response to operation of one of said control button means.

10. Information recording and/or reproducing apparatus as in claim 9; wherein said control button means includes at least ten keys and a serial track selection key, and said sequence data has mixed therein a random track selection sequence and a serial track selection sequence.

11. Information recording and/or reproducing apparatus as cited in claim 10, wherein said serial track selection sequence is defined by actuation of said serial track selection key after selecting a start track by selective actuation of said ten keys.

* * * * *